United States Patent
Suzuki et al.

(10) Patent No.: US 11,057,597 B2
(45) Date of Patent: Jul. 6, 2021

(54) DISPLAY DEVICE, DISPLAY SYSTEM, AND METHOD FOR CONTROLLING DISPLAY DEVICE

(71) Applicant: SEIKO EPSON CORPORATION, Tokyo (JP)

(72) Inventors: Yu Suzuki, Aichi-ken (JP); Masato Yoshihara, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/745,453

(22) Filed: Jan. 17, 2020

(65) Prior Publication Data
US 2020/0236332 A1    Jul. 23, 2020

(30) Foreign Application Priority Data
Jan. 18, 2019 (JP) .............................. JP2019-006669

(51) Int. Cl.
*H04N 9/31* (2006.01)
*G09G 5/373* (2006.01)
*G09F 9/302* (2006.01)

(52) U.S. Cl.
CPC ......... *H04N 9/3188* (2013.01); *G09F 9/3026* (2013.01); *G09G 5/373* (2013.01); *G09G 2300/026* (2013.01)

(58) Field of Classification Search
CPC ..... H04N 9/3188; G09F 9/3026; G09G 5/373
USPC .................. 345/1.3, 589, 633; 715/778, 810
See application file for complete search history.

(56) References Cited

U.S. PATENT DOCUMENTS

| | | | | |
|---|---|---|---|---|
| 7,242,370 B2 * | 7/2007 | Ouchi | ..................... | G09G 5/005 345/1.3 |
| 2011/0102300 A1 * | 5/2011 | Wood | ..................... | G06F 3/1446 345/1.3 |
| 2013/0182002 A1 * | 7/2013 | Macciola | ............... | H04N 1/387 345/589 |
| 2014/0101597 A1 * | 4/2014 | Bamford | ............... | G06F 3/0481 715/778 |
| 2014/0101609 A1 * | 4/2014 | Bamford | ............... | G06F 3/0483 715/810 |
| 2014/0368456 A1 * | 12/2014 | Sakai | ...................... | G06F 3/041 345/173 |
| 2015/0235444 A1 * | 8/2015 | Schowengerdt | ......... | G02B 5/20 345/633 |
| 2018/0301216 A1 * | 10/2018 | Nakamura | ............. | G16H 30/40 |
| 2019/0317719 A1 * | 10/2019 | Baer | ..................... | G06F 3/1446 |

FOREIGN PATENT DOCUMENTS

| | | |
|---|---|---|
| JP | 2007-206356 A | 8/2007 |
| JP | 2015-186125 A | 10/2015 |
| JP | 2017-142339 A | 8/2017 |

* cited by examiner

*Primary Examiner* — Prabodh M Dharia
(74) *Attorney, Agent, or Firm* — Dority & Manning, P.A.

(57) ABSTRACT

A projector is included in a display system having a plurality of projectors. The projector includes: an image input unit having an input image inputted thereto; a projection unit displaying the input image; an estimation unit estimating an arrangement of the plurality of projectors, based on a resolution of the input image and a resolution of an image displayed by the projection unit; and a display control unit causing the projection unit to display an image showing an arrangement of the plurality of projectors, based on a result of estimation by the estimation unit.

19 Claims, 10 Drawing Sheets

DISPLAY DEVICE, DISPLAY SYSTEM, AND METHOD FOR CONTROLLING DISPLAY DEVICE

The present application is based on, and claims priority from JP Application Serial Number 2019-006669, filed Jan. 18, 2019, the disclosure of which is hereby incorporated by reference herein in its entirety.

BACKGROUND

1. Technical Field

The present disclosure relates to a display device, a display system, and a method for controlling a display device.

2. Related Art

According to the related art, a display system which includes a plurality of display devices coupled together via a cable and which displays an image from the plurality of display devices coupled together is known. JP-A-2017-142339 is an example of the related art.

In the display system described in JP-A-2017-142339, a plurality of video display control devices are cascaded from a video source output device and a video is thus transmitted and displayed. Specifically, an upstream video display control device changes control information and graphics data generated in a video area that is used by the upstream video display control device but is not used by a downstream video display control device, and transmits the changed control information and graphics data. The downstream video display control device takes in the control information and the graphics data embedded in the video area used by the upstream video display control device, and also takes in its own video display area, and displays a video in its own video display area, based on the control information and the graphics data transmitted from upstream.

However, in the display system described in JP-A-2017-142339, when one image output device outputs image information to a plurality of display devices and each of the plurality of display devices displays a part of the image information, a user needs to set which part of the image information should be displayed by each of the plurality of display devices. This poses a problem in that its user-friendliness may not be sufficiently high.

SUMMARY

An aspect of the present disclosure is directed to a display device included in a display system having a plurality of display devices. The display device includes: an image input unit having an input image inputted thereto; a display unit displaying the input image; an estimation unit estimating an arrangement of the plurality of display devices, based on a resolution of the input image and a resolution of an image displayed by the display unit; and a display control unit causing the display unit to display an image showing an arrangement of the plurality of display devices, based on a result of estimation by the estimation unit.

The display device may further include: an information input unit accepting an input on the arrangement of the plurality of display devices; and an adjustment unit adjusting the arrangement of the plurality of display devices estimated by the estimation unit, based on the input to the information input unit.

In the display device, the result of estimation by the estimation unit may include a first number of display devices arrayed in a first direction and a second number of display devices arrayed in a second direction intersecting the first direction, of the plurality of display devices forming the display system. The adjustment unit may adjust the first number of display devices and the second number of display devices, based on the input to the information input unit.

The display device may further include a setting unit setting an area displayed by the display unit, of the input image, based on the result of estimation by the estimation unit.

In the display device, the setting unit may set the area in such a way that the input image is displayed by the plurality of display devices.

In the display device, the setting unit may accept an input of coordinates prescribing a position and a size of the area and may set the area based on the coordinates.

Another aspect of the present disclosure is directed to a method for controlling a display device included in a display system having a plurality of display devices. The method includes: an input step of having an input image inputted; an estimation step of estimating an arrangement of the plurality of display devices, based on a resolution of the input image and a resolution of an image displayed by the display device; and a display step of displaying an image showing an arrangement of the plurality of display devices, based on a result of estimation in the estimation step.

Still another aspect of the present disclosure is directed to a display system having a plurality of display devices. Each of the plurality of display devices includes: an image input unit having an input image inputted thereto; a display unit displaying the input image; an estimation unit estimating an arrangement of the plurality of display devices, based on a resolution of the input image and a resolution of an image displayed by the display unit; and a display control unit causing the display unit to display an image showing an arrangement of the plurality of display devices, based on a result of estimation by the estimation unit.

In the display system, the plurality of display devices may be daisy-chained. One of two display devices located at both ends of the plurality of display devices may have an image output device outputting the input image.

DESCRIPTION OF EXEMPLARY EMBODIMENTS

An embodiment will now be described with reference to the drawings.

1. Configuration of Display System

Figure 1:
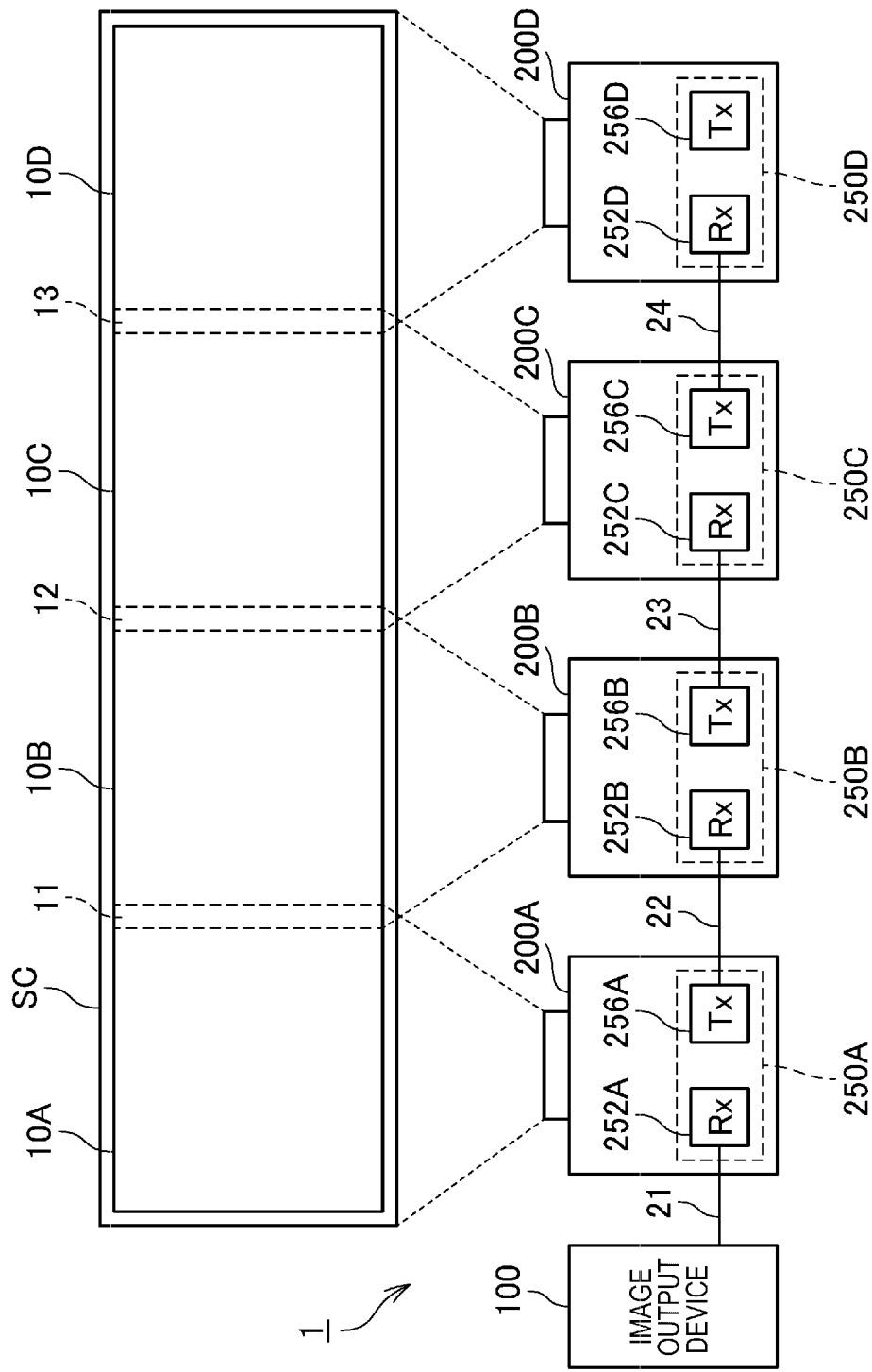
FIG. 1 shows the configuration of a display system.

FIG. 1 shows an example of the configuration of a display system 1.

The display system 1 in this embodiment has an image output device 100 and a plurality of projectors 200. FIG. 1 shows four projectors, that is, a projector 200A, a projector 200B, a projector 200C, and a projector 200D, as the plurality of projectors 200. The number of projectors 200 forming the display system 1 is not limited to four. The number of projectors 200 may be any number equal to or greater than two.

The respective projectors 200A to 200D have the same configuration with each other. The projectors 200A to 200D are equivalent to an example of a "plurality of display devices". Each of the projectors 200A to 200D is equivalent to a "display device".

In the description below, the projectors 200A to 200D may be referred to as the projector 200 when these projectors need not be particularly discriminated from each other.

The image output device 100 is coupled to the projector 200A. The image output device 100 supplies an HDMI (High-Definition Multimedia Interface) (trademark registered) signal to the projector 200A. The HDMI signal includes image data and audio data. The image data may be image data of a dynamic image or image data of a still image. The audio data may be monophonic audio data or stereo audio data. The audio data may also be surround audio data using more audio channels than stereo.

As the image output device 100, for example, a laptop PC (personal computer), desktop PC, tablet terminal, smartphone, PDA (personal digital assistant) or the like can be used. A video playback device, DVD (digital versatile disk) player, Blu-ray disc player, hard disk recorder, television tuner device, CATV (cable television) set-top box, video game machine or the like may also be used as the image output device 100.

The projectors 200A to 200D are daisy-chained by an HDMI cable 22, an HDMI cable 23, and an HDMI cable 24. In other words, the projectors 200A to 200D are coupled in series by the HDMI cables 22, 23, 24.

Specifically, the projectors 200A, 200B, 200C, and 200D are coupled in the following manner.

The projector 200A and the projector 200B are coupled together by the HDMI cable 22. The projector 200B and the projector 200C are coupled together by the HDMI cable 23. The projector 200C and the projector 200D are coupled together by the HDMI cable 24.

The projector 200A has an HDMI communication unit 250A. The HDMI communication unit 250A has an HDMI reception unit 252A and an HDMI transmission unit 256A. In FIG. 1, the HDMI reception unit is referred to as "Rx" and the HDMI transmission unit is referred to as "Tx".

The HDMI reception unit 252A is coupled to the image output device 100 by an HDMI cable 21. The HDMI transmission unit 256A is coupled to the projector 200B by the HDMI cable 22.

The HDMI reception unit 252A of the projector 200A receives an HDMI signal transmitted from the image output device 100. The projector 200A takes in the received HDMI signal and executes processing such as image processing and audio processing. The HDMI transmission unit 256A of the projector 200A transmits the HDMI signal to the projector 200B.

The projector 200B has an HDMI communication unit 250B. The HDMI communication unit 250B has an HDMI reception unit 252B and an HDMI transmission unit 256B. The HDMI reception unit 252B is coupled to the projector 200A by the HDMI cable 22. The HDMI transmission unit 256B is coupled to the projector 200C by the HDMI cable 23.

The HDMI reception unit 252B of the projector 200B receives the HDMI signal transmitted from the projector 200A. The projector 200B takes in the received HDMI signal and executes processing such as image processing and audio processing. The HDMI transmission unit 256B of the projector 200B transmits the HDMI signal to the projector 200C.

The projector 200C has an HDMI communication unit 250C. The HDMI communication unit 250C has an HDMI reception unit 252C and an HDMI transmission unit 256C. The HDMI reception unit 252C is coupled to the projector 200B by the HDMI cable 23. The HDMI transmission unit 256C is coupled to the projector 200D by the HDMI cable 24.

The HDMI reception unit 252C of the projector 200C receives the HDMI signal transmitted from the projector 200B. The projector 200C takes in the received HDMI signal and executes processing such as image processing and audio processing. The HDMI transmission unit 256C of the projector 200C transmits the HDMI signal to the projector 200D.

The projector 200D has an HDMI communication unit 250D. The HDMI communication unit 250D has an HDMI reception unit 252D and an HDMI transmission unit 256D. The HDMI reception unit 252D is coupled to the projector 200C by the HDMI cable 24.

The HDMI reception unit 252D of the projector 200D receives the HDMI signal transmitted from the projector 200C. The projector 200D takes in the received HDMI signal and executes processing such as image processing and audio processing.

Each of the HDMI cables 21, 22, 23, and 24 has a data line for transmitting image data, audio data, and control information. The data line includes three data lines of TMDS (Transition Minimized Differential Signaling) channels #0, #1, #2. These data lines transmit an HDMI signal, which is a differential signal, serially in one direction. Each of the HDMI cables 21, 22, 23, and 24 also has a CEC (Consumer Electronics Control) line and a DDC (Display Data Channel) line. The CEC line is a signal line communicating control data bidirectionally between devices coupled to an HDMI cable. The DDC line is two signal lines used to read out E-EDID (Enhanced Extended Display Identification Data). The E-EDID is device information that specifies a sink device, which is a device on the side receiving the supply of an HDMI signal.

FIG. 1 shows the case where the projectors 200A to 200D are arranged in a line in a horizontal direction DH and where the respective projectors 200 project images juxtaposed to each other on a screen SC. The projector 200A projects an image in a projection area 10A on the screen SC. The projector 200B projects an image in a projection area 10B on the screen SC. The projector 200C projects an image in a projection area 10C on the screen SC. The projector 200D projects an image in a projection area 10D on the screen SC.

The display system 1 performs tiling projection, in which the images projected by the projectors 200A to 200D are connected together on the screen SC so as to project one large-screen image on the screen SC. That is, in tiling projection, the projectors 200 next to each other are arranged in such a way that images projected by projections units 210 are connected together on the screen SC. In this embodiment, the "one large-screen image" is an input image R inputted from the image output device 100 to the projector 200A. The input image R will be described later with reference to FIG. 3.

In tiling projection, the projector 200 projects an image in such a way that an edge of the projected image overlaps an edge of an image projected by the next projector 200. This makes the boundary of the projected images less visible. For example, an edge of the image projected by the projector 200A and an edge of the image projected by the projector 200B located to the right overlap each other, thus forming an overlap area 11. Similarly, an edge of the image projected by the projector 200B and an edge of the image projected by the projector 200C located to the right overlap each other, thus forming an overlap area 12. Similarly, an edge of the image projected by the projector 200C and an edge of the image projected by the projector 200D located to the right overlap each other, thus forming an overlap area 13.

In this embodiment, the case where the projection target to which the projectors 200A to 200D project images is the screen SC is described as an example. However, the projection target is not limited to the screen SC. The projection target may be a uniform flat surface or a curved, discontinuous or irregular surface. Specifically, a wall surface of a building or a surface of an object can be used as the projection target.

The way the projectors 200A to 200D are installed is not limited to placing on a horizontal surface. The projectors 200A to 200D may be suspended from a ceiling or may be mounted on a wall surface.

FIG. 1 shows the case where the projectors 200A to 200D are arranged next to each other in a horizontal line. However, the projectors 200A to 200D may be arranged next to each other in a vertical line. Also, the projectors 200A to 200D may be arranged in two columns by two rows.

2. Configuration of Projector

Figure 2:
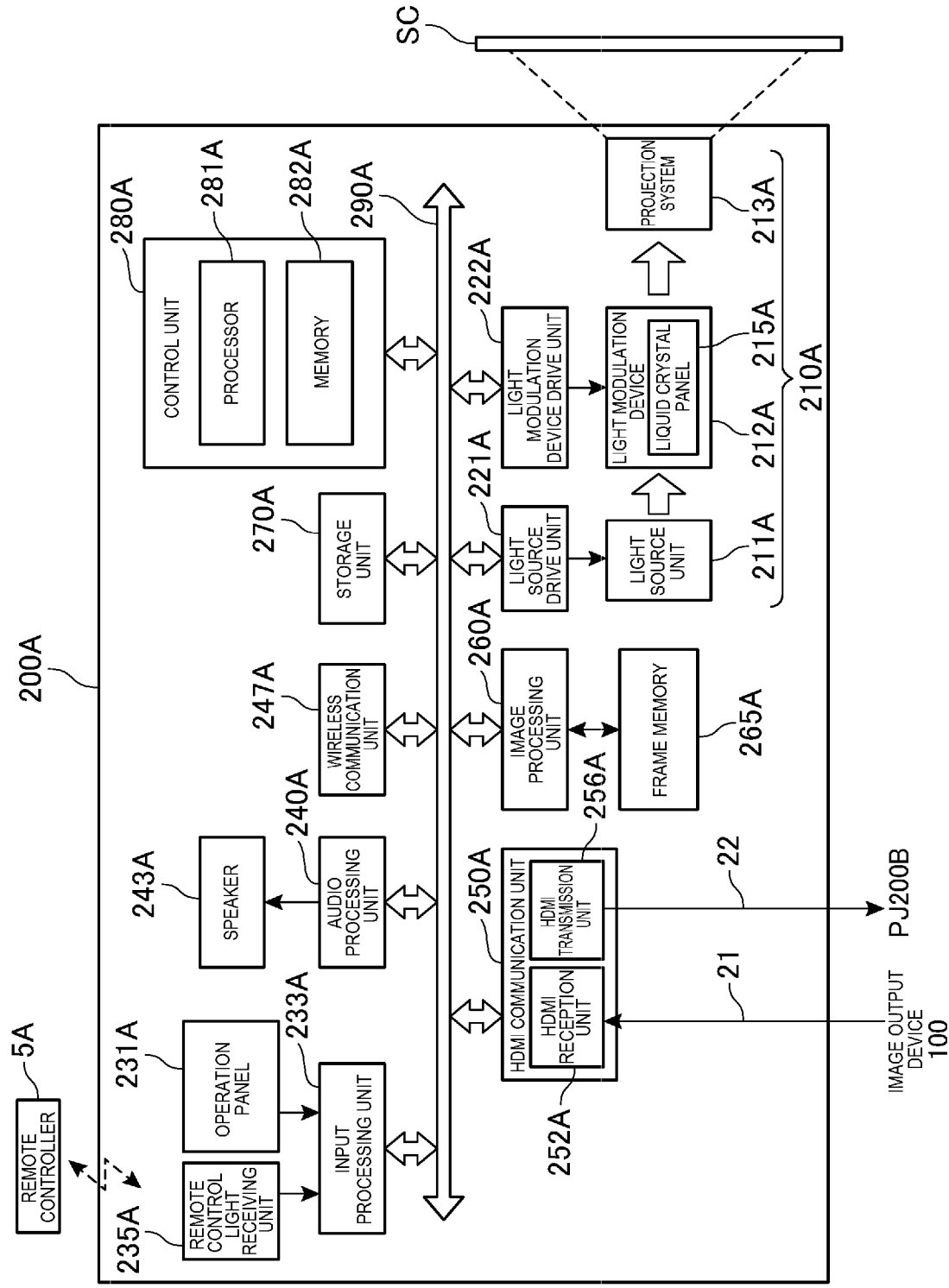
FIG. 2 shows the configuration of a projector.

FIG. 2 shows the configuration of the projector 200A. The projectors 200A to 200D have the same configuration. Therefore, the configuration of the projector 200A is described hereinafter and the description of each of the projectors 200B to 200D is omitted.

In the description below, in order to discriminate components of the respective projectors 200, the letter "A" is added to a component of the projector 200A and the letter "B" is added to a component of the projector 200B. Similarly, the letter "C" is added to a component of the projector 200C and the letter "D" is added to a component of the projector 200D.

For example, a control unit of the projector 200A is referred to as a control unit 280A and a control unit of the projector 200B is referred to as a control unit 280B. Similarly, a control unit of the projector 200C is referred to as a control unit 280C and a control unit of the projector 200D is referred to as a control unit 280D.

The HDMI communication unit 250A of the projector 200A has the HDMI reception unit 252A and the HDMI transmission unit 256A.

The HDMI reception unit 252A has a coupling terminal coupled to the HDMI cable 21, and an interface circuit processing and converting a received HDMI signal into image data, audio data, and control information.

The HDMI transmission unit 256A has a coupling terminal coupled to the HDMI cable 22, and an interface circuit converting image data, audio data, and control information into an HDMI signal.

The projector 200A has a projection unit 210A forming an optical image and projecting the image onto the screen SC. The projection unit 210A has a light source unit 211A, a light modulation device 212A, and a projection system 213A. The projection unit 210A is equivalent to an example of a "display unit".

The light source unit 211A has a light source made up of a xenon lamp, ultra-high-pressure mercury lamp, LED (light-emitting diode), laser light source or the like. The light source unit 211A may also have a reflector and an auxiliary reflector to guide the light emitted from the light source to the light modulation device 212A. The light source unit 211A may also have a lens group to enhance optical properties of projection light, a polarizer, or a light adjustment element reducing the amount of light of the light emitted from the light source, in the path to the light modulation device 212A.

The light source unit 211A is driven by a light source drive unit 221A. The light source drive unit 221A is coupled to an internal bus 290A and turns on and off the light source of the light source unit 211A under the control of the control unit 280A similarly coupled to the internal bus 290A.

The light modulation device 212A has, for example, three liquid crystal panels 215A corresponding to the primary colors of R, G, and B. R represents red. G represents green. B represents blue. That is, the light modulation device 212A has a liquid crystal panel 215A corresponding to R color light, a liquid crystal panel 215A corresponding to G color light, and a liquid crystal panel 215A corresponding to B color light.

The light emitted from the light source unit 211A is separated into three color lights of RGB, which then become incident on the corresponding liquid crystal panels 215A. Each of the liquid crystal panels 215A is a transmission-type liquid crystal panel, and modulates transmitted light and thus generates image light. The image lights passing through and modulated by the respective liquid crystal panels 215A are combined together by a light combining system such as a cross dichroic prism and the combined image exits to the projection system 213A.

The light modulation device 212A is driven by a light modulation device drive unit 222A. The light modulation device drive unit 222A is coupled to the internal bus 290A.

Image data corresponding to the respective primary colors of R, G, B is inputted to the light modulation device drive unit 222A from an image processing unit 260A. The light modulation device drive unit 222A converts the inputted image data into a data signal suitable for the operation of the liquid crystal panels 215A. The light modulation device drive unit 222A applies a voltage to each pixel in each liquid crystal panel 215A, based on the converted data signal, and thus draws an image on each liquid crystal panel 215A.

The projection system 213A has a lens group projecting the image light modulated by the light modulation device 212A onto the screen SC and thus forming an image on the screen SC. The projection system 213A may also have a zoom mechanism to enlarge or reduce the image projected on the screen SC, and a focus adjustment mechanism to adjust focusing.

The projector 200A has an operation panel 231A, a remote control light receiving unit 235A, and an input processing unit 233A. The operation panel 231A and the remote control light receiving unit 235A are coupled to the input processing unit 233A coupled to the internal bus 290A.

The operation panel 231A is provided with various operation keys to operate the projector 200A. The operation panel 231A is provided, for example, with a power key to designate power-on or power-off of the projector 200A, and a menu key to make various settings, or the like. When an operation key is operated, the input processing unit 233A outputs an operation signal corresponding to the operated key to the control unit 280A.

The projector 200A also has a remote controller 5A used by the user. The remote controller 5A has various buttons and transmits an infrared signal corresponding to an operation on these buttons.

The remote control light receiving unit 235A receives the infrared signal transmitted from the remote controller 5A. The input processing unit 233A decodes the infrared signal received by the remote control light receiving unit 235A, generates an operation signal representing the content of the operation on the remote controller 5A, and outputs the operation signal to the control unit 280A.

The projector 200A has an audio processing unit 240A and a speaker 243A.

The audio processing unit 240A performs signal processing such as decoding, D/A conversion, and amplification, of audio data, converts the audio data into an analog audio signal, and outputs the analog audio signal to the speaker 243A.

The projector 200A has a wireless communication unit 247A. The wireless communication unit 247A is coupled to the internal bus 290A and operates under the control of the control unit 280A.

The wireless communication unit 247A has an antenna and an RF (radio frequency) circuit or the like, not illustrated, and executes wireless communication with an external device under the control of the control unit 280A. As the wireless communication method of the wireless communication unit 247A, a short-range wireless communication method such as wireless LAN (local area network,) Bluetooth (trademark registered), UWB (ultra-wide band), or infrared communication, can be employed. Also, a wireless communication method using a mobile phone network can be employed as the wireless communication method of the wireless communication unit 247A.

The projector 200A has an image processing system. The image processing system is formed mainly of the control unit 280A comprehensively controlling the entirety of the projector 200A. The image processing system also includes the image processing unit 260A, a frame memory 265A, and a storage unit 270A. The control unit 280A, the image processing unit 260A, and the storage unit 270A are coupled in such a way as to be able to data communicate with each other via the internal bus 290A.

The image processing unit 260A loads the image data received from the image output device 100 into the frame memory 265A and processes the image data. The processing performed by the image processing unit 260A includes, for example, resolution conversion processing, resizing processing, shape correction processing such as distortion correction, digital zoom processing, color tone correction processing, luminance correction processing, and the like. The image processing unit 260A executes processing designated by the control unit 280A and performs the processing using a parameter inputted from the control unit 280A according to need. The image processing unit 260A can also execute a combination of a plurality of types of processing, of the above processing. The image processing unit 260A reads out the image data whose processing is finished, from the frame memory 265A, and outputs the image data to the light modulation device drive unit 222A.

The storage unit 270A is, for example, an auxiliary storage device such as a hard disk device. The storage unit 270A may be replaced by a DRAM (dynamic RAM), a flash memory that can store a large volume of information, or an optical disc such as a CD (compact disc), DVD (digital versatile disc), or BD (Blu-ray disc). The storage unit 270A stores a control program executed by the control unit 280A and various data.

The storage unit 270A also stores identification information of each of the projectors 200A to 200D. The same applies to the storage units 270B, 270C, 270D. The identification information of each projector 200 may be inputted by the user operating the operation panel 231A. Alternatively, the device information of each projector 200 read out from the E-EDID via the DDC line may be used.

The control unit 280A controls each part of the projector 200A. The control unit 280A has a processor 281A such as a CPU (central processing unit) as hardware, a memory 282A such as a ROM (read-only memory) and RAM (random-access memory), and other peripheral circuits or the like.

The ROM is a non-volatile storage device such as a flash ROM and stores the control program and data. The RAM is used as a work area when the CPU performs arithmetic processing. The processor 281A loads the control program read out from the ROM or the storage unit 270A into the RAM and executes the loaded control program to control each part of the projector 200A. The configuration of the control unit 280A will be described in detail below with reference to FIG. 3.

3. Configuration of Control Unit

Figure 3:
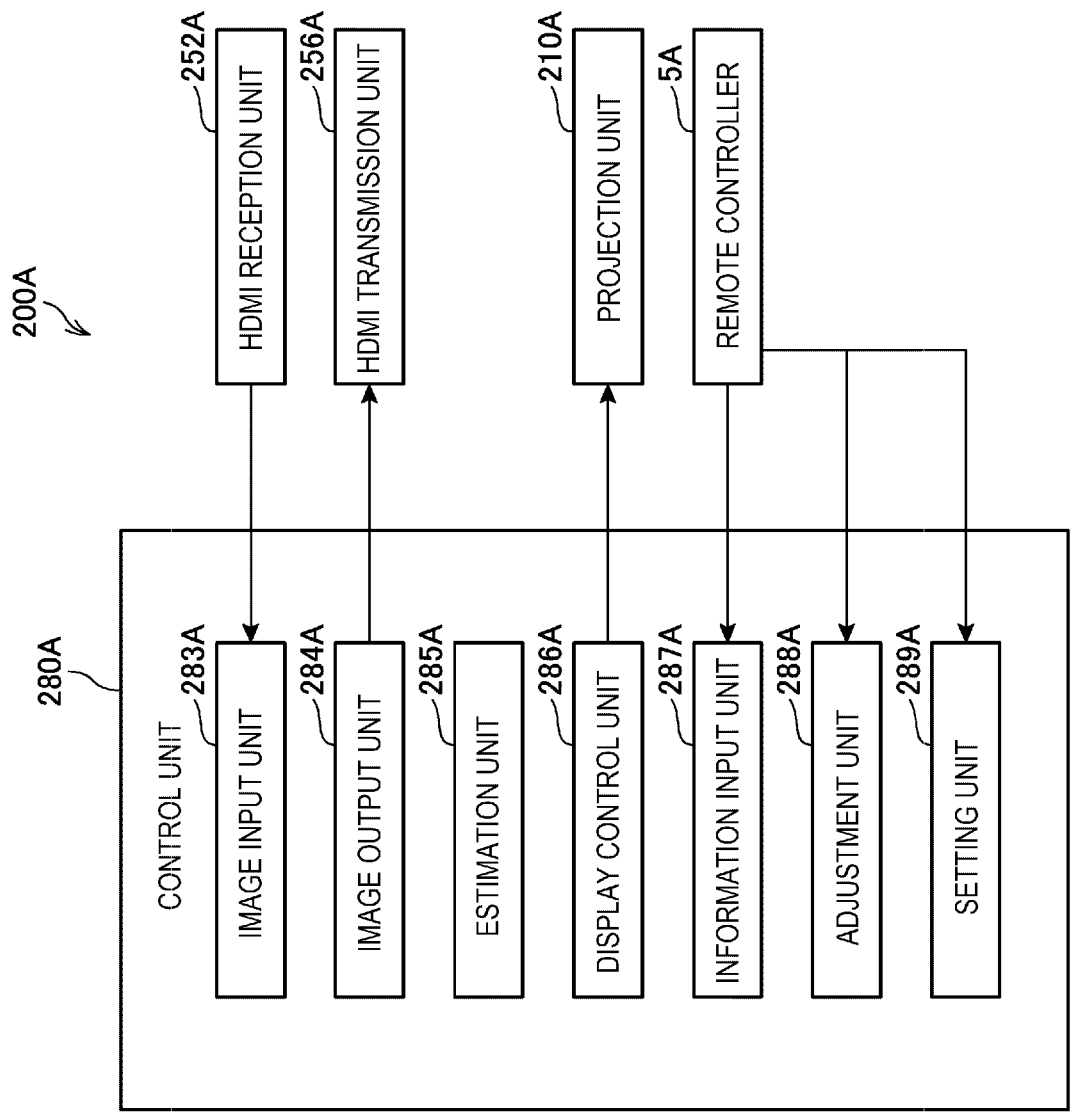
FIG. 3 shows the configuration of a control unit of the projector.

FIG. 3 shows the configuration of the control unit 280A of the projector 200A. The control units 280A to 280D have the same configuration. Therefore, the configuration of the control unit 280A is described and the description of each of the control units 280B to 280D is omitted.

The control unit 280A has an image input unit 283A, an image output unit 284A, an estimation unit 285A, a display control unit 286A, an information input unit 287A, an adjustment unit 288A, and a setting unit 289A.

Specifically, the processor 281A of the control unit 280A executes the control program read out from the ROM or the storage unit 270A and thus functions as the image input unit 283A, the image output unit 284A, the estimation unit 285A, the display control unit 286A, the information input unit 287A, the adjustment unit 288A, and the setting unit 289A.

The input image R is inputted to the image input unit 283A. Specifically, the input image R is inputted to the image input unit 283A from the image output device 100 via the HDMI reception unit 252A. The input image R is projected onto the screen SC by the projectors 200A to 200D.

The image output unit 284A outputs the input image R to the projector 200B via the HDMI transmission unit 256A.

The estimation unit 285A estimates an arrangement of a plurality of projectors 200, based on the resolution of the input image R and the resolution of a display image P. The display image P represents an image corresponding to the input image R and displayed by the projection unit 210A. Specifically, the display image P is an image corresponding to a part or the entirety of the input image R.

In this embodiment, the resolution of the input image R is defined by a number of pixels RW in a horizontal direction DH of the input image R and a number of pixels RH in a vertical direction DV of the input image R. The resolution of the display image P is defined by a number of pixels PW in the horizontal direction DH of the display image P and a number of pixels PH in the vertical direction DV of the display image P. The horizontal direction DH and the vertical direction DV will be described in detail later with reference to FIG. 4.

In this embodiment, the estimation unit 285A estimates a first number N1 of projectors arrayed in a first direction D1 and a second number N2 of projectors arrayed in a second direction D2 intersecting the first direction D1, of the plurality of projectors 200 forming the display system 1. In other words, the result of the estimation by the estimation unit 285A includes the first number N1 of projectors arrayed in the first direction D1 and the second number N2 of projectors arrayed in the second direction D2 intersecting the first direction D1, of the plurality of projectors 200 forming the display system 1. The first direction D1 corresponds to, for example, the horizontal direction DH. The second direction D2 corresponds to, for example, the vertical direction DV.

The display control unit 286A causes the projection unit 210A to display an image showing the arrangement of the plurality of projectors 200, based on the result of the estimation by the estimation unit 285A. The display control unit 286A also causes the projection unit 210A to display the input image R. Specifically, the display control unit 286A causes the projection unit 210A to display a part or the entirety of the input image R.

The information input unit 287A accepts an input on the arrangement of the plurality of projectors 200. In this embodiment, the information input unit 287A accepts an input by the user on the arrangement of the plurality of projectors 200 from the remote controller 5A.

The adjustment unit 288A adjusts the arrangement of the plurality of projectors 200 estimated by the estimation unit 285A, based on the input to the information input unit 287A. Specifically, the adjustment unit 288A adjusts the first number N1 of projectors and the second number N2 of projectors, based on the input to the information input unit 287A.

The setting unit 289A sets an area displayed by the projection unit 210A, of the input image R, based on the result of the estimation by the estimation unit 285A. In other words, the setting unit 289A sets an area of the display image P displayed by the projector 200A, of the input image R, based on the result of the estimation by the estimation unit 285A.

The setting unit 289A sets the area in such a way that the input image R is displayed by the plurality of projectors 200.

For example, when the plurality of projectors 200 is formed of the projectors 200A to 200D, as shown in FIG. 1, the setting unit 289A sets the area in the following manner. That is, the projector 200A displays a display image PA. The projector 200B displays a display image PB. The projector 200C displays a display image PC. The projector 200D displays a display image PD. The setting unit 289A sets an area of the input image R corresponding to the display image PA in such a way that the display image PA, the display image PB, the display image PC, and the display image PD together show the input image R. Similarly, the setting unit 289B sets an area of the input image R corresponding to the display image PB. The setting unit 289C sets an area of the input image R corresponding to the display image PC. The setting unit 289D sets an area of the input image R corresponding to the display image PD.

For example, the area of the input image R corresponding to the display image PA is equivalent to the projection area 10A shown in FIG. 1. The area of the input image R corresponding to the display image PB is equivalent to the projection area 10B shown in FIG. 1. The area of the input image R corresponding to the display image PC is equivalent to the projection area 10C shown in FIG. 1. The area of the input image R corresponding to the display image PD is equivalent to the projection area 10D shown in FIG. 10.

4-1. First Specific Example of Processing by Control Unit

Figure 4:
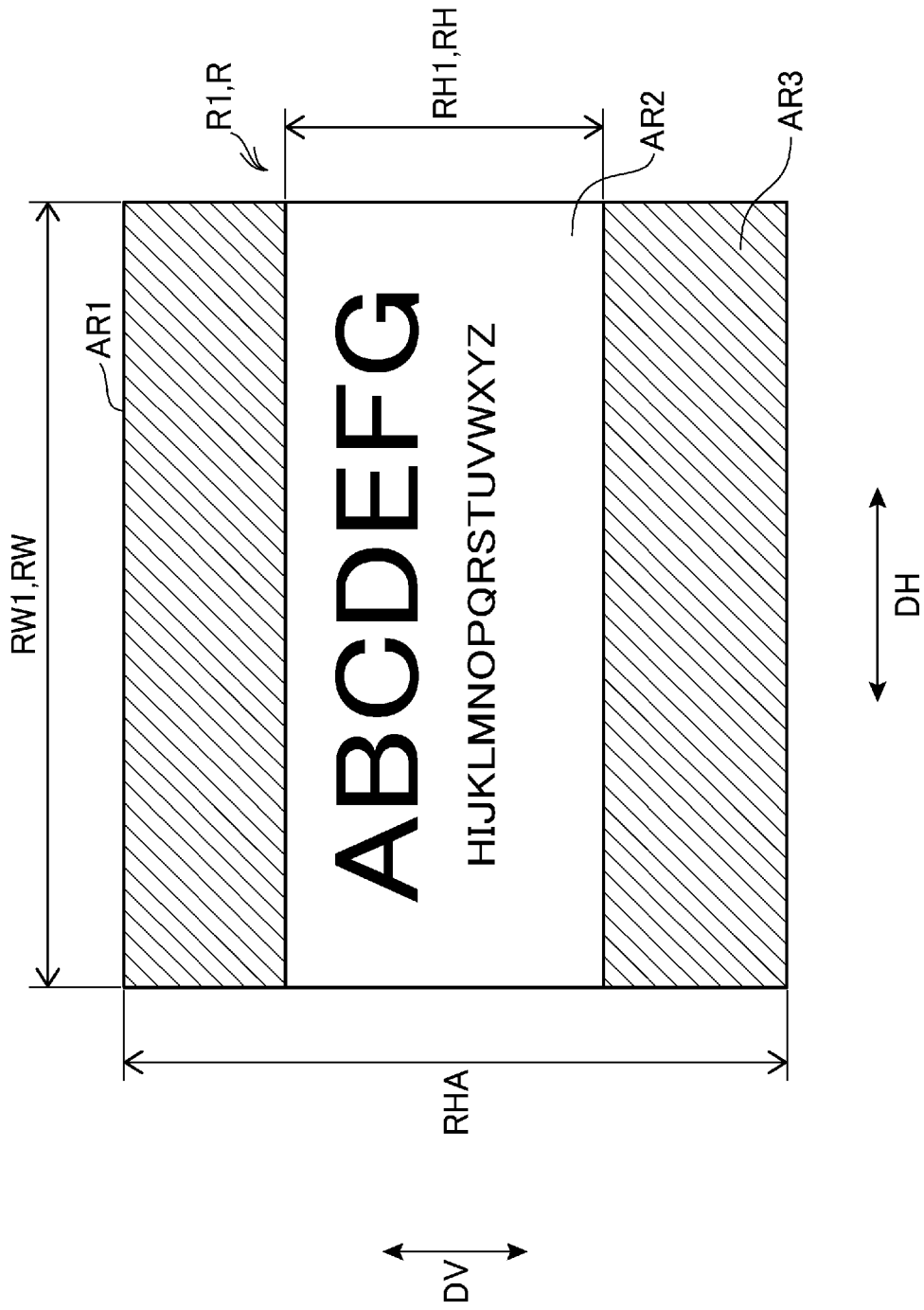
FIG. 4 shows an example of an input image.

FIG. 4 shows an input image R1 as an example of the input image R.

As shown in FIG. 4, the resolution of the input image R1 is prescribed by a number of pixels RHA in the vertical direction DV and a number of pixels RW1 in the horizontal direction DH. The number of pixels RHA is, for example, 1080. The number of pixels RW1 is 1920. The horizontal direction DH represents, for example, a main scanning direction. The vertical direction DV represents, for example, a sub-scanning direction.

The input image R1 is formed of a first area AR1, a second area AR2, and a third area AR3. An image is formed in the second area AR2. In contrast, no image is formed in the first area AR1 or the third area AR3. In other words, the pixels forming the first area AR1 are entirely black and the first area AR1 is a strip-shaped solid black image. Similarly, the pixels forming the third area AR3 are entirely black and the third area AR3 is a strip-shaped solid black image.

In such a case, the estimation unit 285A uses the number of pixels in the vertical direction DV of the second area AR2, as a number of pixels RH1 in the vertical direction DV of the input image R1. That is, the estimation unit 285A prescribes the resolution of the input image R1 by the number of pixels RH1 in the vertical direction DV and the number of pixels RW1 in the horizontal direction DH. The number of pixels RH1 is, for example, 720. The number of pixels RW1 is 1920.

The strip-shaped solid black image is determined, for example, in the following manner. That is, a pixel value with the highest luminance, of the pixels included in one line in the main scanning direction, is found. The main scanning direction is equivalent to the horizontal direction DH. When the pixel value with the highest luminance is less than a threshold, it is determined that the pixel forms a part of the strip-shaped solid black image. For example, when the range of pixel value is 0 to 255, that is, when the pixel value ranges over 256 intensity levels, the threshold is, for example, 10.

Figure 5:
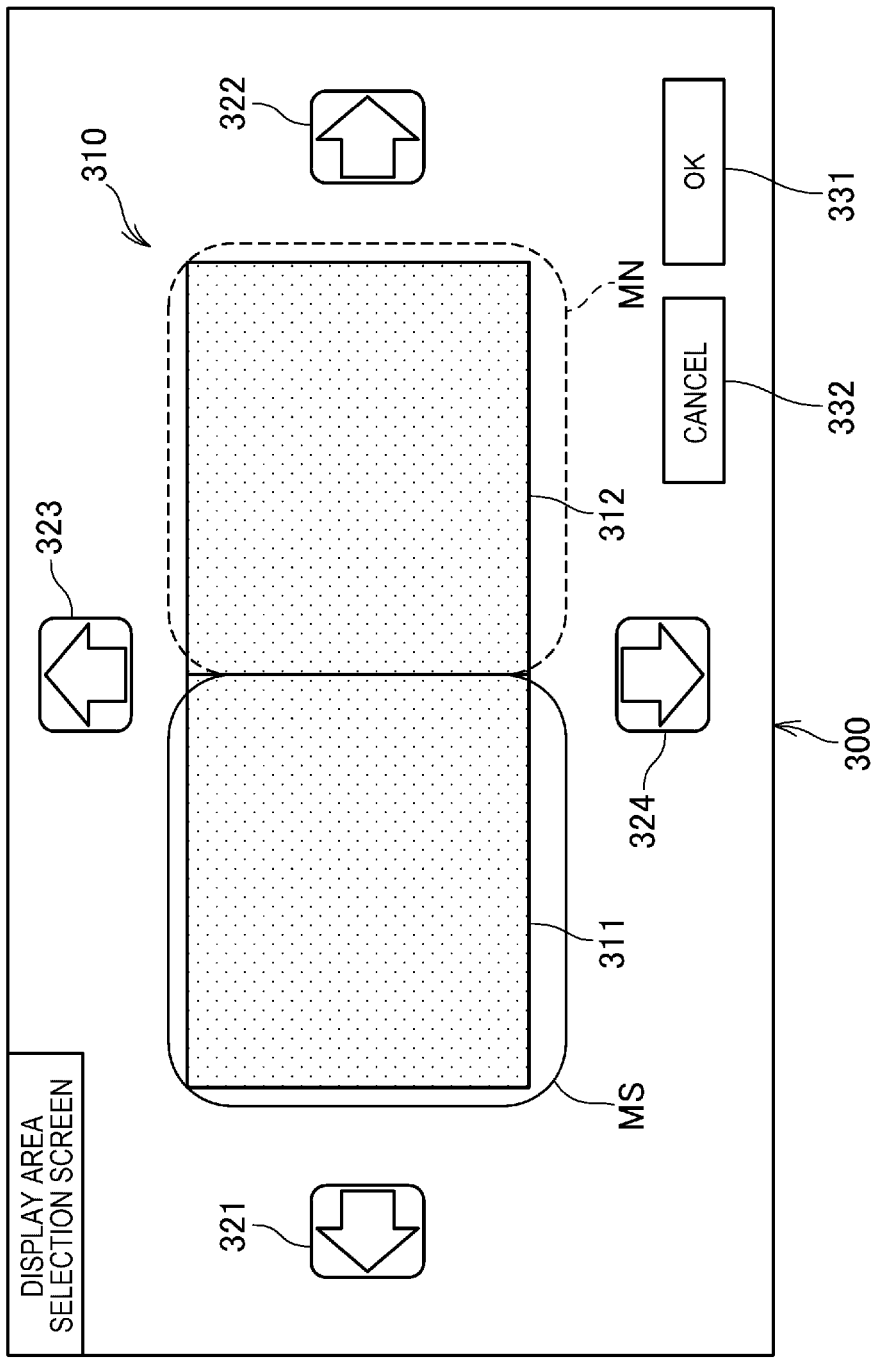
FIG. 5 shows an example of a display area selection screen.

FIG. 5 shows an example of a display area selection screen 300.

The display area selection screen 300 is displayed by the display control unit 286A. For example, when the input image R1 shown in FIG. 4 is inputted to the image input unit 283A, the display control unit 286A causes the projection unit 210A to display the display area selection screen 300 shown in FIG. 5.

The resolution of the display image P displayed by the projection unit 210A is prescribed by the number of pixels PH in the vertical direction DV and the number of pixels PW in the horizontal direction DH. The number of pixels PH is, for example, 1080. The number of pixels PW is, for example, 1920.

In this embodiment, the display control unit 286A enlarges the input image R1 with its aspect ratio fixed and in such a way that the number of pixels RH in the vertical direction DV coincides with the number of pixels PH in the vertical direction DV of the display image P. The display control unit 286A thus generates an input image R1D. The display control unit 286A causes the projection unit 210A to display the input image R1D instead of the input image R1.

The input image R1D represents an image formed by enlarging the input image R1 by a magnification of PH/RH1 with its aspect ratio fixed.

In this case, a number of pixels RH1D in the vertical direction DV of the input image R1D coincides with the number of pixels PH in the vertical direction DV of the display image P, and a number of pixels RW1D in the horizontal direction DH of the input image R1D is found by the following equation (1).

$$RW1D = RW1 \times (PH/RH1) \tag{1}$$

Specifically, the number of pixels RW1D in the horizontal direction DH of the input image R1D is 2880. Consequently, the number of pixels RW1D is 1.5 times the number of pixels PW (=1920) in the horizontal direction DH of the display image P. Thus, the estimation unit 285A estimates that the first number N1 of projectors, which represents the number of projectors 200 arrayed in the horizontal direction DH, is two, and that the second number N2 of projectors, which represents the number of projectors 200 arrayed in the vertical direction DV, is one. The method for calculating the first number N1 of projectors and the second number N2 of projectors by the estimation unit 285A will be described in detail later with reference to FIG. 7.

The display area selection screen 300 includes an arrangement image 310, a left button 321, a right button 322, an up button 323, a down button 324, an OK button 331, and a cancel button 332. The display area selection screen 300 is equivalent to an example of an OSD (on-screen display).

The arrangement image 310 is an example of an image showing an arrangement of the plurality of projectors 200. The arrangement image 310 is formed of a first projector image 311 and a second projector image 312. Each of the first projector image 311 and the second projector image 312 represents a projector 200. The first projector image 311 and the second projector image 312 are arrayed in the horizontal direction DH.

That is, the arrangement image 310 shows that the first number N1 of projectors is two and that the second number N2 of projectors is one. The first number N1 of projectors represents the number of projectors 200 arranged in the horizontal direction DH. The second number N2 of projectors represents the number of projectors 200 arranged in the vertical direction DV.

A selection marker MS is attached to the first projector image 311. The selection marker MS indicates that the first projector image 311 is in a selected state. The selection marker MS is arranged in such a way as to surround the first projector image 311 and is shown by a solid line.

A non-selection marker MN is attached to the second projector image 312. The non-selection marker MN indicates that the second projector image 312 is not in a selected state. The non-selection marker MN is arranged in such a way as to surround the second projector image 312 and is shown by a dashed line.

When an arrow button of the remote controller 5A is pressed, the information input unit 287A changes an object where a cursor is located. The object includes the first projector image 311, the second projector image 312, the left button 321, the right button 322, the up button 323, the down button 324, the OK button 331, and the cancel button 332.

Each of the first projector image 311 and the second projector image 312 can be switched between a selected state and an unselected state.

For example, when the first projector image 311 is in the selected state and the following operation is detected, the information input unit 287A shifts the first projector image 311 from the selected state into the unselected state. That is, when a press on a decision button of the remote controller 5A is detected in the state where the cursor is located at the first projector image 311, the information input unit 287A shifts the first projector image 311 from the selected state into the unselected state. The information input unit 287A then attaches the non-selection marker MN to the first projector image 311, instead of the selection marker MS.

Also, for example, when the second projector image 312 is in the unselected state and the following operation is detected, the information input unit 287A shifts the second projector image 312 from the unselected state into the selected state. That is, when a press on the decision button of the remote controller 5A is detected in the state where the cursor is located at the second projector image 312, the information input unit 287A shifts the second projector image 312 from the unselected state into the selected state. The information input unit 287A then attaches the selection marker MS to the second projector image 312, instead of the non-selection marker MN.

Each of the left button 321 and the right button 322 is pressed to increase or decrease the first number N1 of projectors. When a press on the decision button of the remote controller 5A is detected in the state where the cursor is located at the left button 321, the information input unit 287A detects that the left button 321 has been pressed. When a press on the decision button of the remote controller 5A is detected in the state where the cursor is located at the right button 322, the information input unit 287A detects that the right button 322 has been pressed.

When the information input unit 287A detects a press on the left button 321 in the state where the first projector image 311 is in the selected state as shown in FIG. 5, the adjustment unit 288A increases the first number N1 of projectors by one. Consequently, the first number N1 of projectors is increased to three and the display control unit 286A displays the arrangement image 310 in the display area selection screen 300 shown in FIG. 6.

Also, when information input unit 287A detects a press on the right button 322 in the state where the second projector image 312 is in the selected state as shown in FIG. 5, the adjustment unit 288A increases the first number N1 of projectors by one. Consequently, the first number N1 of projectors is increased to three and the display control unit 286A displays the arrangement image 310 in the display area selection screen 300 shown in FIG. 6.

When the information input unit 287A detects a press on the right button 322 in the state where the first projector image 311 is in the selected state as shown in FIG. 5, the adjustment unit 288A decreases the first number N1 of projectors by one. Consequently, the first number N1 of projectors is decreased to one.

Also, when the information input unit 287A detects a press on the left button 321 in the state where the second projector image 312 is in the selected state as shown in FIG. 5, the adjustment unit 288A decreases the first number N1 of projectors by one. Consequently, the first number N1 of projectors is decreased to one.

In this way, the information input unit 287A accepts an input by the user of the remote controller 5A, and the adjustment unit 288A increases or decreases the first number N1 of projectors according to the input accepted by the information input unit 287A. That is, the adjustment unit 288A adjusts the first number N1 of projectors, based on the input to the information input unit 287A.

Each of the up button 323 and the down button 324 is used to change the second number N2 of projectors. The up button 323 and the down button 324 will be described in detail later with reference to FIG. 8.

The OK button 331 is pressed to decide an arrangement of the plurality of projectors 200. That is, the OK button 331 is pressed to decide the first number N1 of projectors and the second number N2 of projectors. When the information input unit 287A detects a press on the OK button 331, the adjustment unit 288A decides the first number N1 of projectors and the second number N2 of projectors.

The cancel button 332 is pressed to cancel an arrangement of the plurality of projectors 200. That is, when one of the first number N1 of projectors and the second number N2 of projectors is changed and the information input unit 287A detects a press on the cancel button 332, the adjustment unit 288A returns the first number N1 of projectors and the second number N2 of projectors to the initial state. That is, the adjustment unit 288A restores the first number N1 of projectors and the second number N2 of projectors estimated by the estimation unit 285A.

Figure 6:
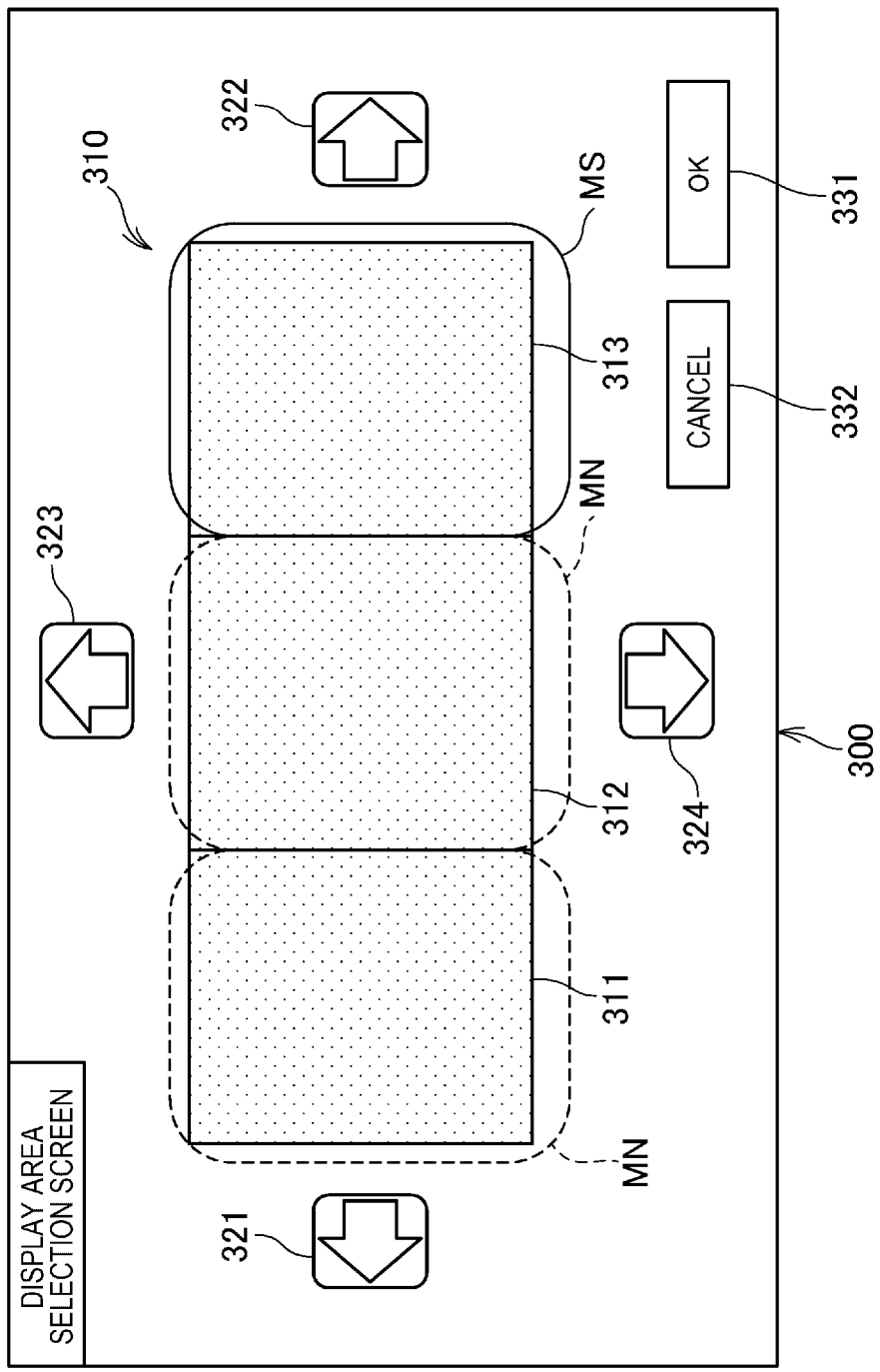
FIG. 6 shows another example of the display area selection screen.

FIG. 6 shows another example of the display area selection screen 300.

The arrangement image 310 in the display area selection screen 300 shown in FIG. 5 and the arrangement image 310 in the display area selection screen 300 shown in FIG. 6 are different from each other in that the former is formed of two images, whereas the latter is formed of three images. That is, the arrangement images 310 shown in FIGS. 5 and 6 are different from each other in that the first number N1 of projectors is two in the display area selection screen 300 shown in FIG. 5, whereas the first number N1 of projectors is three in the display area selection screen 300 shown in FIG. 6. Hereinafter, the difference from the display area selection screen 300 shown in FIG. 5 is mainly described.

As shown in FIG. 6, the display area selection screen 300 includes an arrangement image 310, a left button 321, a right button 322, an up button 323, a down button 324, an OK button 331, and a cancel button 332.

The arrangement image 310 is an example of an image showing an arrangement of the plurality of projectors 200. The arrangement image 310 is formed of a first projector image 311, a second projector image 312, and a third projector image 313. Each of the first projector image 311, the second projector image 312, and the third projector image 313 represents a projector 200. The first projector image 311, the second projector image 312, and the third projector image 313 are arrayed in the horizontal direction DH.

That is, the arrangement image 310 shows that the first number N1 of projectors is three and that the second number N2 of projectors is one. The first number N1 of projectors represents the number of projectors 200 arranged in the horizontal direction DH. The second number N2 of projectors represents the number of projectors 200 arranged in the vertical direction DV.

A non-selection marker MN is attached to each of the first projector image 311 and the second projector image 312. A selection marker MS is attached to the third projector image 313.

When the information input unit 287A detects a press on the right button 322 in the state where the third projector image 313 is in the selected state as shown in FIG. 6, the adjustment unit 288A increases the first number N1 of projectors by one. Consequently, the first number N1 of projectors is increased to four.

Meanwhile, when the information input unit 287A detects a press on the left button 321 in the state where the third projector image 313 is in the selected state, the adjustment unit 288A decreases the first number N1 of projectors by one. Consequently, the first number N1 of projectors is decreased to two.

Also, for example, when the information input unit 287A detects a press on the left button 321 in the state where the first projector image 311 is in the selected state, the adjustment unit 288A increases the first number N1 of projectors by one. Consequently, the first number N1 of projectors is increased to four.

Meanwhile, for example, when the information input unit 287A detects a press on the right button 322 in the state where the first projector image 311 is in the selected state, the adjustment unit 288A decreases the first number N1 of projectors by one. Consequently, the first number N1 of projectors is decreased to two.

4-2. Second Specific Example of Processing by Control Unit

Figure 7:
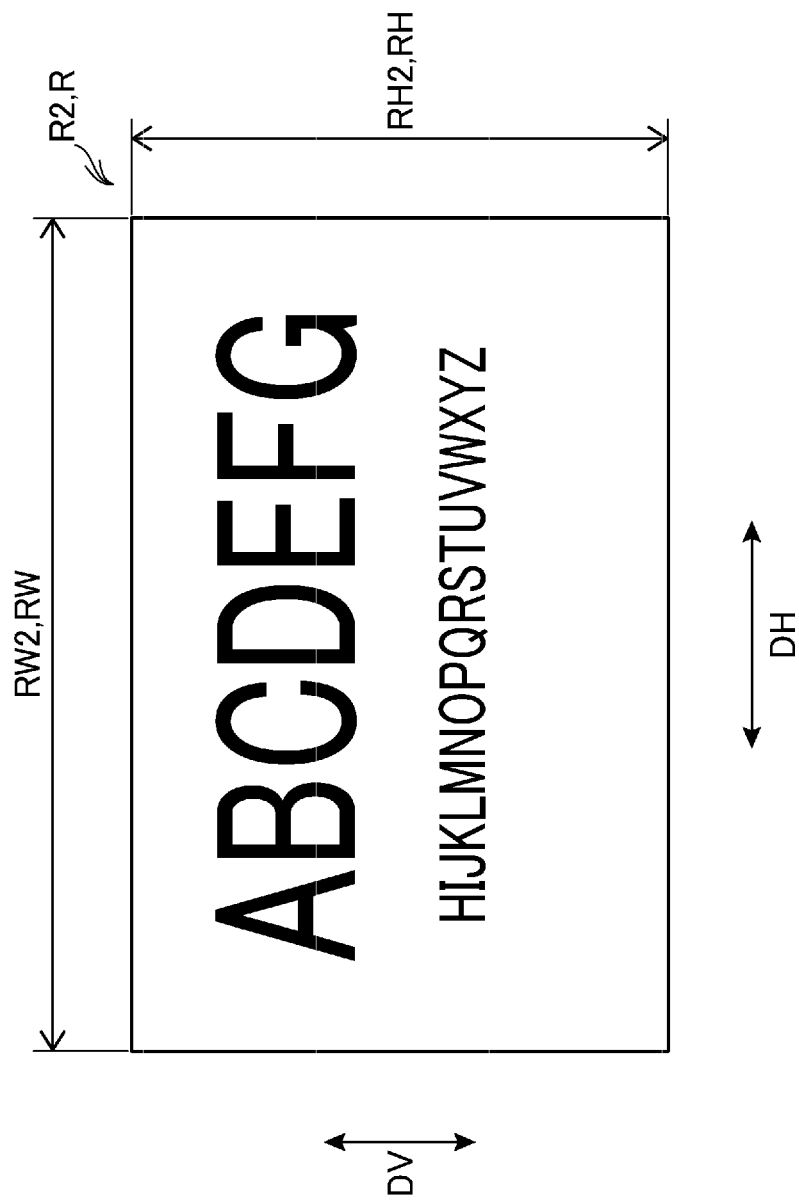
FIG. 7 shows another example of the input image.

FIG. 7 shows an input image R2 as an example of the input image R.

The input image R2 is different from the input image R1 shown in FIG. 4 in that the aspect ratio of the input image R2 represents a greater height than that of the input image R1. The resolution of the input image R2 is prescribed by a number of pixels RH2 in the vertical direction DV and a number of pixels RW2 in the horizontal direction DH. The number of pixels RH2 is, for example, 2160. The number of pixels RW2 is 3840.

In the description below, the aspect ratio is defined as the number of pixels in the horizontal direction DH: the number of pixels in the vertical direction DV. Specifically, the aspect ratio of the input image R1 is approximately 2.67:1, whereas the aspect ratio of the input image R2 is approximately 1.78:1.

The estimation unit 285A estimates the first number N1 of projectors, which represents the number of projectors 200 arrayed in the horizontal direction DH, by the following equation (2).

$$N1=[RW/PW] \quad (2)$$

The brackets represent a Gaussian symbol. That is, the estimation unit 285A estimates that the first number N1 of projectors is a minimum integer equal to or greater than the quotient of the number of pixels RW in the horizontal direction DH of the input image R divided by the number of pixels PW in the horizontal direction DH of the display image P.

The estimation unit 285A also estimates the second number N2 of projectors, which represents the number of projectors 200 arrayed in the vertical direction DV, by the following equation (3)

$$N2=[RH/PH] \quad (3)$$

That is, the estimation unit 285A estimates that the second number N2 of projectors is a minimum integer equal to or greater than the quotient of the number of pixels RH in the vertical direction DV of the input image R divided by the number of pixels PH in the vertical direction DV of the display image P.

When the input image R is the input image R2, the estimation unit 285A estimates that the first number N1 of projectors is two, based on the equation (2), and that the second number N2 of projectors is two, based on the equation (3).

Figure 8:
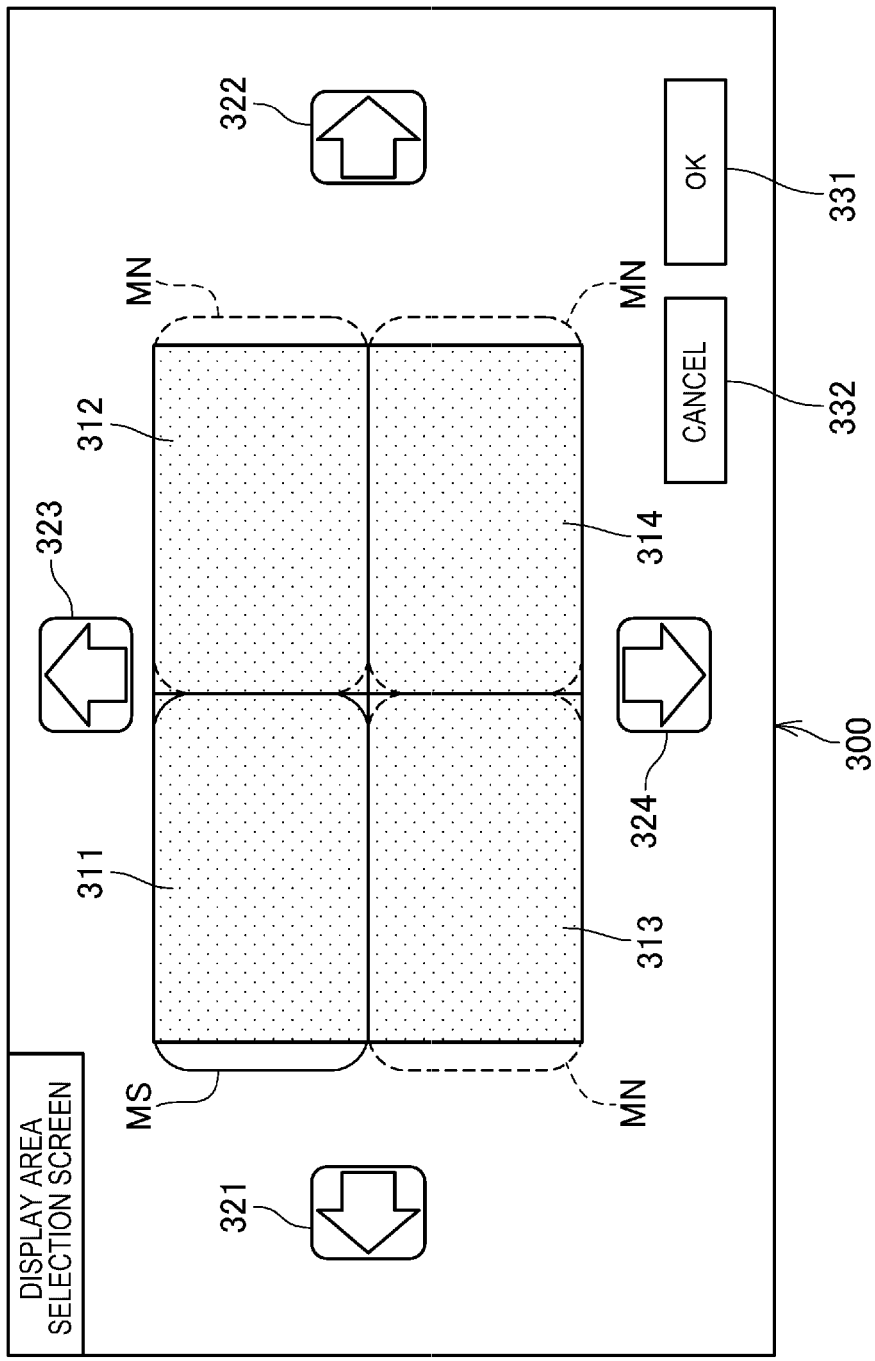
FIG. 8 shows still another example of the display area selection screen.

FIG. 8 shows still another example of the display area selection screen 300.

The display area selection screen 300 is displayed by the display control unit 286A. For example, when the input image R2 shown in FIG. 7 is inputted to the image input unit 283A, the display control unit 286A causes the projection unit 210A to display the display area selection screen 300 shown in FIG. 8.

The resolution of the display image P displayed by the projection unit 210 is prescribed by the number of pixels PH in the vertical direction DV and the number of pixels PW in the horizontal direction DH. The number of pixels PH is, for example, 1080. The number of pixels PW is, for example, 1920.

The arrangement images 310 in the display area selection screens 300 shown in FIGS. 5 and 6 and the arrangement image 310 in the display area selection screen 300 shown in FIG. 8 are different in that the former shows that the second number N2 of projectors is one, whereas the latter shows that the second number N2 of projectors is two. Hereinafter, the difference from the display area selection screens 300 shown in FIGS. 5 and 6 will be mainly described.

As shown in FIG. 8, the display area selection screen 300 includes an arrangement image 310, a left button 321, a right button 322, an up button 323, a down button 324, an OK button 331, and a cancel button 332.

The arrangement image 310 is an example of an image showing an arrangement of the plurality of projectors 200. The arrangement image 310 is formed of a first projector image 311, a second projector image 312, a third projector image 313, and a fourth projector image 314. Each of the first projector image 311, the second projector image 312, the third projector image 313, and the fourth projector image 314 represents a projector 200.

The first projector image 311 and the second projector image 312 are arrayed in the horizontal direction DH. Similarly, the third projector image 313 and the fourth projector image 314 are arrayed in the horizontal direction DH.

The first projector image 311 and the third projector image 313 are arrayed in the vertical direction DV. Similarly, the second projector image 312 and the fourth projector image 314 are arrayed in the vertical direction DV.

The arrangement image 310 shows that the first number N1 of projectors is two and that the second number N2 of projectors is two. The first number N1 of projectors represents the number of projectors 200 arranged in the horizontal direction DH. The second number N2 of projectors represents the number of projectors 200 arranged in the vertical direction DV.

A selection marker MS is attached to the first projector image 311. A non-selection marker MN is attached to each of the second projector image 312, the third projector image 313, and the fourth projector image 314.

When the information input unit 287A detects a press on the up button 323 in the state where the first projector image 311 is in the selected state as shown in FIG. 8, the adjustment unit 288A increases the second number N2 of projectors by one. Consequently, the second number N2 of projectors is increased to three.

Meanwhile, when the information input unit 287A detects a press on the down button 324 in the state where the first projector image 311 is in the selected state, the adjustment unit 288A decreases the second number N2 of projectors by one. Consequently, the second number N2 of projectors is decreased to one.

The case where the first projector image 311 is in the selected state is described with reference to FIG. 8. However, when the first projector image 311 is in the unselected state and the third projector image 313 or the fourth projector image 314 is in the selected state, the second number N2 of projectors is increased or decreased in the following manner.

That is, when the information input unit 287A detects a press on the up button 323 in the state where the third projector image 313 or the fourth projector image 314 is in the selected state, the adjustment unit 288A decreases the second number N2 of projectors by one. Consequently, the second number N2 of projectors is decreased to one.

Meanwhile, when the information input unit 287A detects a press on the down button 324 in the state where the third projector image 313 or the fourth projector image 314 is in the selected state, the adjustment unit 288A increases the second number N2 of projectors by one. Consequently, the second number N2 of projectors is increased to three.

In this manner, the information input unit 287A accepts an input by the user of the remote controller 5A, and the adjustment unit 288A increases or decreases the second number N2 of projectors according to the input accepted by the information input unit 287A. That is, the adjustment unit 288A adjusts the second number N2 of projectors, based on the input to the information input unit 287A.

4-3. Processing by Control Unit

Figure 9:
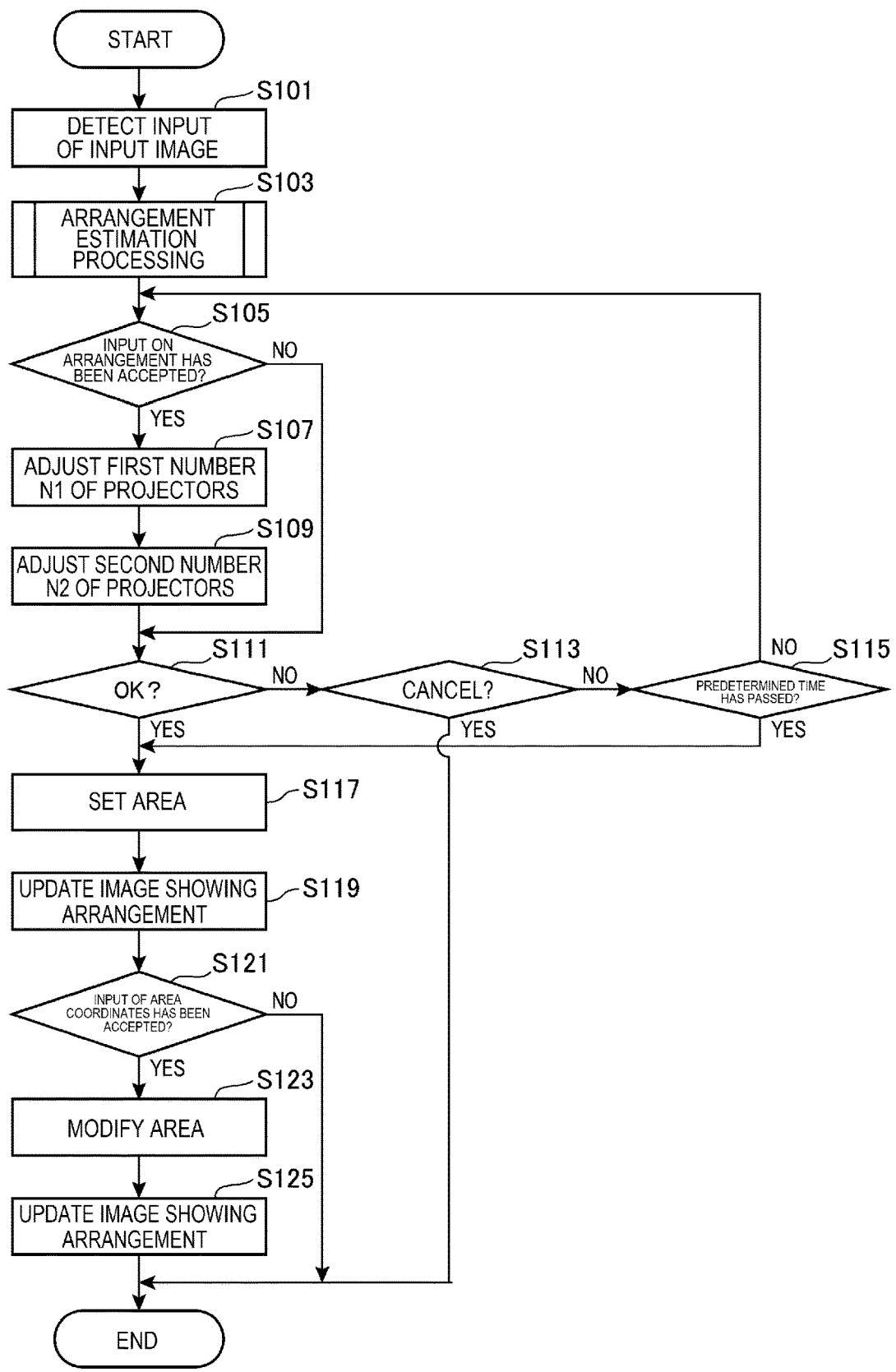
FIG. 9 is a flowchart showing processing by the control unit of the projector.

FIG. 9 is a flowchart showing processing by the control unit 280A of the projector 200A.

As shown in FIG. 9, first in step S101, the image input unit 283A detects an input of the input image R from the image output device 100.

Next, in step S103, the control unit 280A executes "arrangement estimation processing". The "arrangement estimation processing" refers to processing to estimate an arrangement of the plurality of projectors 200. The "arrangement estimation processing" will be described in detail later with reference to FIG. 10.

Next, in step S105, the information input unit 287A determines whether an input on the arrangement of the plurality of projectors 200 has been accepted or not.

When the information input unit 287A determines that an input on the arrangement of the plurality of projectors 200 has not been accepted (NO in step S105), the processing shifts to step S111. When the information input unit 287A determines that an input on the arrangement of the plurality of projectors 200 has been accepted (YES in step S105), the processing shifts to step S107.

In step S107, the adjustment unit 288A adjusts the first number N1 of projectors, based on the input accepted by the information input unit 287A.

Next, in step S109, the adjustment unit 288A adjusts the second number N2 of projectors, based on the input accepted by the information input unit 287A.

Next, in step S111, the control unit 280A determines whether a press on the OK button 331 has been accepted or not.

When the control unit 280A determines that a press on the OK button 331 has been accepted (YES in step S111), the processing shifts to step S117. When the control unit 280A determines that a press on the OK button 331 has not been accepted (NO in step S111), the processing shifts to step S113.

In step S113, the control unit 280A determines whether a press on the cancel button 332 has been accepted or not.

When the control unit 280A determines that a press on the cancel button 332 has been accepted (YES in step S113), the display control unit 286A displays an image showing the previously set arrangement as the arrangement image 310 in the display area selection screen 300 and the processing subsequently ends. When the control unit 280A determines that a press on the cancel button 332 has not been accepted (NO in step S113), the processing shifts to step S115.

In step S115, the control unit 280A determines whether a predetermined time has passed or not. The predetermined time is, for example, one minute.

When the control unit 280A determines that the predetermined time has not passed (NO in step S115), the processing returns to step S105. When the control unit 280A determines that the predetermined time has passed (YES in step S115), the processing shifts to step S117.

In step S117, the setting unit 289A sets an area displayed by the projection unit 210A, of the input image R.

For example, the input image R is divided in the horizontal direction DH into a number of image segments corresponding to the first number N1 of projectors and is divided in the vertical direction DV into a number of image segments corresponding to the second number N2 of projectors. The setting unit 289A sets the area of the generated image segments, as the area displayed by the projection unit 210A.

More specifically, the resolution of the display image P is prescribed by the number of pixels PH in the vertical direction DV and the number of pixels PW in the horizontal direction DH. Therefore, the division of the input image R in the horizontal direction DH starts at the pixel at the left end of the input image R, and the input image R is divided every number of pixels PW in the horizontal direction DH of the display image P. The division of the input image R in the vertical direction DV starts at the pixel at the top end of the input image R, and the input image R is divided every number of pixels PH in the vertical direction DV of the display image P.

Next, in step S119, the display control unit 286A updates the arrangement image 310 in the display area selection screen 300 as the image showing the arrangement of the plurality of projectors 200 and causes the projection unit 210A to display the updated arrangement image 310.

Next, in step S121, the information input unit 287A determines whether the coordinates of the area displayed by the projection unit 210A, of the input image R, have been accepted or not.

Specifically, the display control unit 286A displays the coordinates of the four corners of the first projector image 311 of the arrangement image 310 in the display area selection screen 300 shown in FIG. 5, in a modifiable manner. The information input unit 287A accepts an input of the coordinates of the four corners of the first projector image 311, based on an input to the remote controller 5A by the user. Thus, the setting unit 289A modifies the coordinates of the area displayed by the projection unit 210A.

When the information input unit 287A determines that the coordinates of the area have not been accepted (NO in step S121), the processing ends. When the information input unit 287A determines that the coordinates of the area have been accepted (YES in step S121), the processing shifts to step S123.

In step S123, the setting unit 289A modifies the area displayed by the projection unit 210A.

Next, in step S125, the display control unit 286A updates the arrangement image 310 in the display area selection screen 300 as the image showing the arrangement of the plurality of projectors 200 and causes the projection unit 210A to display the updated arrangement image 310. Subsequently, the processing ends.

Figure 10:
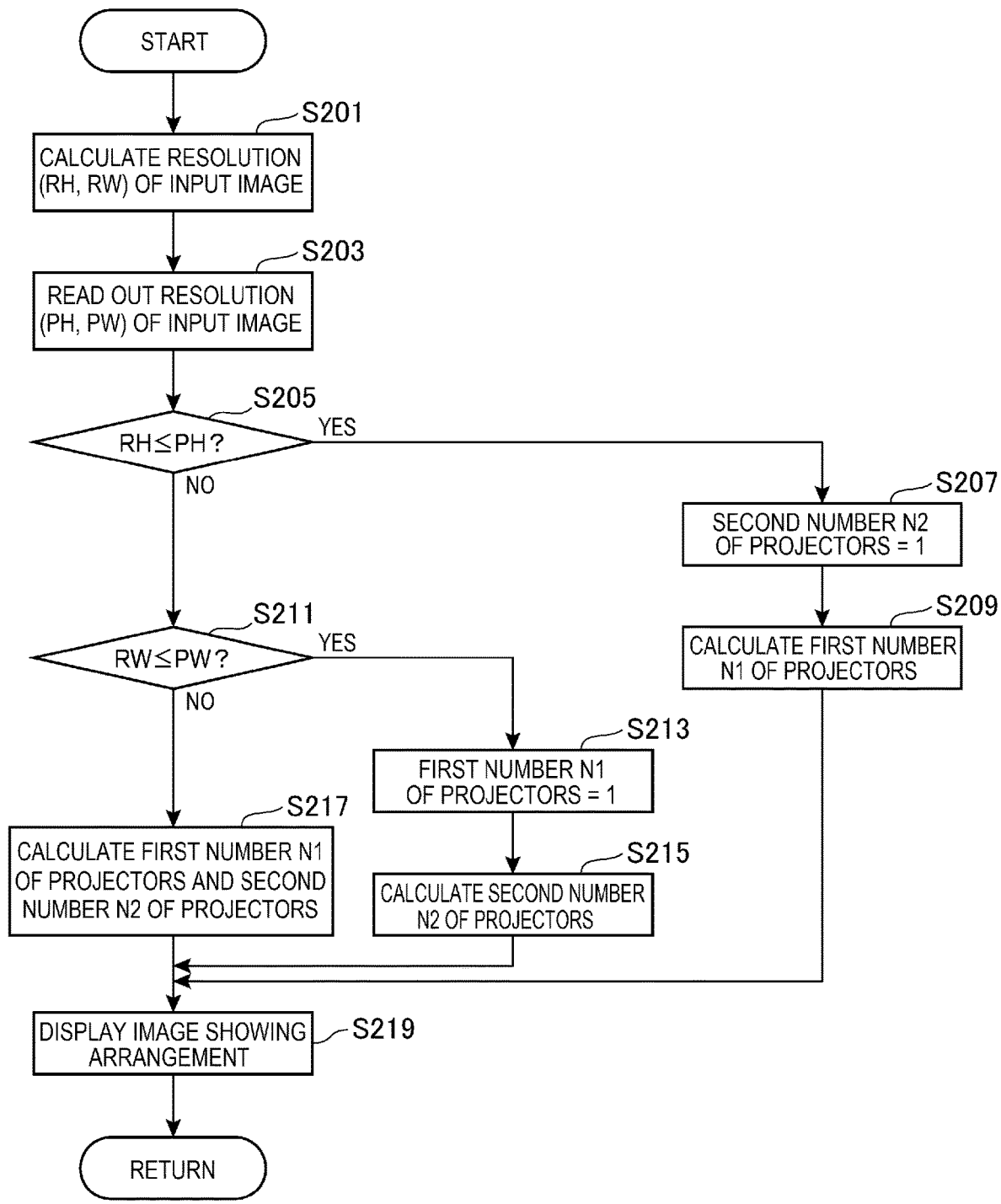
FIG. 10 is a flowchart showing arrangement estimation processing by the control unit of the projector.

FIG. 10 is a flowchart showing the arrangement estimation processing by the control unit 280A of the projector 200A.

As shown in FIG. 10, first in step S201, the estimation unit 285A calculates the number of pixels RW in the horizontal direction DH and the number of pixels RH in the vertical direction DV of the input image R.

Next, in step S203, the estimation unit 285A reads out the number of pixels PH in the vertical direction DV and the number of pixels PW in the horizontal direction DH of the display image P. Information representing the number of pixels PH and information representing the number of pixels PW are stored, for example, in the memory 282A.

Next, in step S205, the estimation unit 285A determines whether the number of pixels RH is equal to or fewer than the number of pixels PH, or not.

When the estimation unit 285A determines that the number of pixels RH is not equal to or fewer than the number of pixels PH (NO in step S205), the processing shifts to step S211. When the estimation unit 285A determines that the number of pixels RH is equal to or fewer than the number of pixels PH (YES in step S205), the processing shifts to step S207.

In step S207, the estimation unit 285A estimates that the second number N2 of projectors is one. The second number N2 of projectors represents the number of projectors 200 arrayed in the vertical direction DV.

Next, in step S209, the estimation unit 285A calculates the first number N1 of projectors, using the equation (2) described with reference to FIG. 7. The processing then shifts to step S219. The first number N1 of projectors represents the number of projectors 200 arrayed in the horizontal direction DH.

When the estimation unit 285A determines that the number of pixels RH is not equal to or fewer than the number of pixels PH (NO in step S205), the estimation unit 285A in step S211 determines whether the number of pixels RW is equal to or fewer than the number of pixels PW, or not.

When the estimation unit 285A determines that the number of pixels RW is not equal to or fewer than the number of pixels PW (NO in step S211), the processing shifts to step S217. When the estimation unit 285A determines that the number of pixels RW is equal to or fewer than the number of pixels PW (YES in step S211), the processing shifts to step S213.

In step S213, the estimation unit 285A estimates that the first number N1 of projectors is one.

Next, in step S215, the estimation unit 285A calculates the second number N2 of projectors, using the equation (3) described with reference to FIG. 7. The processing then shifts to step S219.

When the estimation unit 285A determines that the number of pixels RH is not equal to or fewer than the number of pixels PH (NO in step S205), the estimation unit 285A in step S217 calculates the first number N1 of projectors, using the equation (2) described with reference to FIG. 7, and calculates the second number N2 of projectors, using the equation (3) described with reference to FIG. 7.

Then, in step S219, the display control unit 286A causes the projection unit 210A to display the arrangement image 310 in the display area selection screen 300 as the image showing the arrangement of the plurality of projectors 200. Subsequently, the processing returns to step S105 in FIG. 9.

Step S101 is equivalent to an example of an "input step". Steps S201 to S217 are equivalent to an example of an "estimation step". Step S219 is equivalent to an example of a "display step".

In this embodiment, as described above with reference to the drawings, the input image R is inputted to the image input unit 283A. The estimation unit 285A estimates an arrangement of the plurality of projectors 200, based on the resolution of the input image R and the resolution of the display image P. The display control unit 286A causes the projection unit 210A to display an image showing the arrangement of the plurality of projectors 200, based on the result of the estimation by the estimation unit 285A.

Thus, the arrangement of the plurality of projectors 200 can be easily decided. Therefore, the user need not set the arrangement of the plurality of projectors 200, in each projector 200. This can improve user-friendliness.

In this embodiment, the information input unit 287A accepts an input on the arrangement of the plurality of projectors 200. The adjustment unit 288A adjusts the arrangement of the plurality of projectors 200 estimated by the estimation unit 285A, based on the input to the information input unit 287A.

Thus, when the arrangement of the plurality of projectors 200 estimated by the estimation unit 285A is different from the arrangement desired by the user, the user can adjust the arrangement of the plurality of projectors 200 estimated by the estimation unit 285A. This can improve user-friendliness.

In this embodiment, the estimation unit 285A estimates the first number N1 of projectors arrayed in the first direction D1 and the second number N2 of projectors arrayed in the second direction D2 intersecting the first direction D1, of the plurality of projectors 200 forming the display system 1. The first direction D1 corresponds, for example, to the horizontal direction DH. The second direction D2 corresponds, for example, to the vertical direction DV. The adjustment unit 288A adjusts the first number N1 of projectors and the second number N2 of projectors, based on the input to the information input unit 287A.

Thus, when at least one of the first number N1 of projectors and the second number N2 of projectors estimated by the estimation unit 285A is different from the number of projectors desired by the user, the user can adjust the arrangement of the plurality of projectors 200 by increasing or decreasing one of the first number N1 of projectors and the second number N2 of projectors. This can improve user-friendliness.

In this embodiment, the setting unit 289A sets an area displayed by the projection unit 210A, of the input image R, based on the result of the estimation by the estimation unit 285A.

Thus, the user need not set the area displayed by the projection unit 210A. This can improve user-friendliness.

In this embodiment, the setting unit 289A sets the area displayed by the projection unit 210A in such a way that the input image R is displayed by the plurality of projectors 200.

Thus, the input image R can be displayed by the plurality of projectors 200. This can improve user-friendliness.

In this embodiment, the setting unit 289A accepts an input of coordinates prescribing the position and size of the area displayed by the projection unit 210A and sets the area, based on the coordinates. For example, the setting unit 289A sets the coordinates of the four corners of the area displayed by the projection unit 210A and thus sets the area displayed by the projection unit 210A.

Thus, the user can easily set the area displayed by the projection unit 210A. This can improve user-friendliness.

In this embodiment, the plurality of projectors 200 are daisy-chained. The image output device 100 outputs the input image R to one projector 200 of the two projectors 200 located at both ends of the plurality of projectors 200.

Thus, the input image R can be inputted to the plurality of projectors 200 by a simple configuration.

The foregoing embodiment is simply an embodiment example and does not limit the form of embodiment. Different forms of embodiment can also be employed.

In the embodiment, for example, the projector 200 is employed as an example of the display device. However, the display device may also be a liquid crystal monitor, liquid crystal television or the like that displays an image on a liquid crystal panel. Also, a device having a plasma display panel, an OLED (organic light-emitting diode), or an organic EL display panel such as an OEL (organic electroluminescence) display may be employed.

In the embodiment, the plurality of projectors 200 are daisy-chained. However, the form of embodiment is not limited to this. The display system 1 may have an image distributor between the image output device 100 and the plurality of projectors 200. The image distributor outputs the input image R outputted from the image output device 100, to each of the plurality of projectors 200.

In the embodiment, processing to make the boundary between projected images less visible, that is, so-called "edge blending processing", is not described. However, a setting about the edge blending processing may be executed. Specifically, the setting unit 289A may execute a setting about the edge blending processing before setting the area of the input image R corresponding to the display image P displayed by the projector 200A, via the display area selection screen 300. That is, when setting the area of the input image R corresponding to the display image P, the setting unit 289A may utilize the result of the setting about the edge blending processing executed before that.

In the embodiment, when the number of pixels RH1 in the vertical direction DV of the input image R1 is fewer than the number of pixels PH in the vertical direction DV of the display image P, the input image R1 is enlarged. However, the form of embodiment is not limited to this. Even when the number of pixels RH1 in the vertical direction DV of the input image R1 is fewer than the number of pixels PH in the vertical direction DV of the display image P, the input image R1 may be displayed in its original size without being enlarged by the plurality of projectors 200 or by one projector 200.

In the embodiment, the information input unit 287A accepts an input from the user, based on an operation on the remote controller 5A. However, the form of embodiment is not limited to this. The information input unit 287A may accept an input from the user, based on an operation on the operation panel 231A. The information input unit 287A may also accept an input from the user via the wireless communication unit 247A.

In the embodiment, although a configuration in which the light modulation device 212A has the liquid crystal panel 215A is described as an example, the liquid crystal panel 215A may be a transmission-type liquid crystal panel or reflection-type liquid crystal panel. The light modulation device 212A may have a configuration using a digital mirror device (DMD) instead of the liquid crystal panel 215A. The light modulation device 212A may also have a configuration using a combination of a digital mirror device and a color wheel. The light modulation device 212A may also employ a configuration that can modulate light emitted from the light source, other than the liquid crystal panel and the DMD.

Each functional unit of the projector 200A shown in FIG. 2 and each functional unit of the control unit 280A shown in FIG. 3 represent a functional configuration and are not particularly limited to any specific form of installation. That is, individual pieces of hardware corresponding to the respective functional units need not necessarily be installed. One processor may execute a program and thus implement functions of a plurality of functional units. A part of the functions implemented by software in the embodiment may be implemented by hardware. Apart of the functions implemented by hardware may be implemented by software. Also, the specific detailed configuration of each of the other parts of the projector 200 can be arbitrarily changed without departing from the spirit and scope of the present disclosure.

The processing in the flowcharts shown in FIGS. 9 and 10 is divided into steps according to the main processing content in order to facilitate understanding of the processing in the projector 200 or the display system 1. The way the processing is divided into steps and the names thereof shown in FIGS. 9 and 10 do not limit the form of embodiment. The processing by the control unit 280 can be divided into more steps according to the processing content or can be divided in such a way that one processing step includes more processing. Also, the processing orders in the flowcharts and sequence charts are not limited to the illustrated examples.

A method for controlling the display device can be implemented by causing a computer provided in the display device to execute a program corresponding to the method for controlling the display device. This program can be recorded in a computer-readable recording medium. As the recording medium, a magnetic or optical recording medium or a semiconductor memory device can be used. Specifically, a portable or fixed recording medium such as a flexible disk, CD-ROM (compact disk read-only memory), DVD, Blu-ray (trademark registered) disc, optical disc, flash memory, or card-type recording medium, can be employed. The recording medium may also be a non-volatile storage device such as a RAM, ROM or HDD, which is an internal storage device provided in the image display device. A program corresponding to the method for controlling the display device may be stored into a server device or the like, and the program may be downloaded from the server device to the display device, so as to implement the method for controlling the display device.

What is claimed is:

1. A display device included in a display system having a plurality, of display devices, the display device comprising:
   one or more processors programmed to:
   accept an input image;
   control the display device to display a display image based on the input image;
   estimate an arrangement of the plurality of display devices based on a resolution of the input image and a resolution of the display image;
   control the display device to display an arrangement image showing an arrangement of the plurality of display devices, based on the estimate of the arrangement of the plurality of display devices; and
   accept a user input to adjust the arrangement of the plurality of display devices, the user input increasing or decreasing a number of the plurality of displays based on the number of the plurality of display devices selected by the user.

2. The display device according to claim 1, wherein estimate of the arrangement of the plurality of display devices includes a first number of display devices arrayed in a first direction and a second number of display devices arrayed in a second direction intersecting the first direction, of the plurality of display devices forming the display system, and wherein the one or more processors are programmed to:
   adjust the first number of display devices and the second number of display devices, based on the input.

3. The display device according to claim 1,
   wherein the one or more processors are programmed to:
   set an area of the input image that is displayed, based on the estimate of the arrangement of the plurality of display devices.

4. The display device according to claim 3, wherein the area is set so that the input image is displayed by the plurality of display devices.

5. The display device according to claim 3, wherein the one or more processors are programmed to:
   accept an input of coordinates prescribing a position and a size of the area; and
   set the size of the area based on the coordinates.

6. The display device according to claim 1, wherein the plurality of display devices are daisy-chained, and one of two display devices located at both ends of the plurality of display devices accepts the input image.

7. A method for controlling a display device included in a display system having a plurality of display devices, the method comprising:
   accepting an input image;
   controlling the display device to display a display image based on the input image;
   estimating an arrangement of the plurality of display devices, based on a resolution of the input image and a resolution of the display image;
   controlling the display device to display an arrangement image showing an arrangement of the plurality of display devices, based on the estimate of the arrangement of the plurality of display devices; and
   accepting a user input to adjust the arrangement of the plurality of display devices, the user input increasing or decreasing a number of the plurality of displays based on the number of the plurality of display devices selected by the user.

8. The method according to claim 7, further comprising:
   accepting an input on the arrangement of the plurality of display devices; and
   adjusting the arrangement of the plurality of display devices estimated, based on the input.

9. The method according to claim 7, wherein the estimation of the arrangement of the plurality of display devices includes a first number of display devices arrayed in a first direction and a second number of display devices arrayed in a second direction intersecting the first direction, of the plurality of display devices forming the display system, and further comprising:

adjusting the first number of display devices and the second number of display devices, based on the input.

10. The method according to claim 7, further comprising:
setting an area of the input image that is displayed, based on the estimate of the arrangement of the plurality of display devices.

11. The method according to claim 10, wherein the area is set so that the input image is displayed by the plurality of display devices.

12. The method according to claim 10, further comprising:
accepting an input of coordinates prescribing a position and a size of the area; and
setting the size of the area based on the coordinates.

13. A display system having a plurality of display devices, each of the plurality of display devices comprising:
one or more processors programmed to:
accept an input image;
control the display device to display a display image based on the input image;
estimate an arrangement of the plurality of display devices based on a resolution of the input image and a resolution of the display image; and
control the display device to display an arrangement image showing an arrangement of the plurality of display devices, based on the estimate of the arrangement of the plurality of display devices; and
accept a user input to adjust the arrangement of the plurality of display devices, the user input increasing or decreasing a number of the plurality of displays based on the number of the plurality of display devices selected by the user.

14. The display system according to claim 13, wherein the plurality of display devices are daisy-chained, and the display system further comprises an image output device to output the input image to one of two display devices located at both ends of the plurality of display devices.

15. The display system according to claim 13, wherein the one or more processors are programmed to:
accept an input on the arrangement of the plurality of display devices; and
adjust the arrangement of the plurality of display devices estimated by the one or more processors, based on the input.

16. The display system according to claim 15, wherein the estimate of the arrangement of the plurality of display devices includes a first number of display devices arrayed in a first direction and a second number of display devices arrayed in a second direction intersecting the first direction, of the plurality of display devices forming the display system, and wherein the one or more processors are programmed to:
adjust the first number of display devices and the second number of display devices, based on the input.

17. The display system according to claim 13, wherein the one or more processors are programmed to:
set an area of the input image that is displayed, based on the estimate of the arrangement of the plurality of display devices.

18. The display system according to claim 17, wherein the area is set so that the input image is displayed by the plurality of display devices.

19. The display system according to claim 17, wherein the one or more processors are programmed to:
accept an input of coordinates prescribing a position and a size of the area; and
set the size of the area based on the coordinates.

* * * * *